US007831668B2

(12) United States Patent
Deeds

(10) Patent No.: US 7,831,668 B2
(45) Date of Patent: Nov. 9, 2010

(54) TERMINAL AND COMPUTER PROGRAM PRODUCT FOR REPLYING TO AN EMAIL MESSAGE USING ONE OF A PLURALITY OF COMMUNICATION METHODS

(75) Inventor: Douglas Deeds, Bedford, TX (US)

(73) Assignee: Nokia Corporation, Espoo (FI)

( * ) Notice: Subject to any disclaimer, the term of this patent is extended or adjusted under 35 U.S.C. 154(b) by 1268 days.

(21) Appl. No.: 11/052,320

(22) Filed: Feb. 7, 2005

(65) Prior Publication Data

US 2006/0179114 A1 Aug. 10, 2006

(51) Int. Cl.
G06F 15/16 (2006.01)
(52) U.S. Cl. ...................................................... 709/206
(58) Field of Classification Search ................. 709/203, 709/206, 207, 227
See application file for complete search history.

(56) References Cited

U.S. PATENT DOCUMENTS

| 5,546,447 | A | 8/1996 | Skarbo et al. | |
|---|---|---|---|---|
| 6,215,784 | B1 | 4/2001 | Petras et al. | |
| 6,430,604 | B1 * | 8/2002 | Ogle et al. ................... | 709/203 |
| 6,502,127 | B1 | 12/2002 | Edwards et al. | |
| 6,754,317 | B1 | 6/2004 | Berthoud et al. | |
| 6,775,359 | B1 | 8/2004 | Ron et al. | |
| 6,785,710 | B2 * | 8/2004 | Kikinis ....................... | 709/206 |
| 6,792,082 | B1 | 9/2004 | Levine | |
| 6,895,426 | B1 * | 5/2005 | Cortright et al. ............ | 709/206 |
| 7,117,445 | B2 * | 10/2006 | Berger ......................... | 715/752 |
| 7,363,345 | B2 * | 4/2008 | Austin-Lane et al. ....... | 709/207 |
| 7,539,699 | B2 * | 5/2009 | Kobashikawa et al. ...... | 709/206 |
| 2002/0075305 | A1 * | 6/2002 | Beaton et al. ............... | 345/751 |
| 2002/0164006 | A1 | 11/2002 | Weiss | |
| 2002/0188684 | A1 | 12/2002 | Liang | |
| 2002/0194281 | A1 | 12/2002 | McConnell et al. | |
| 2003/0016805 | A1 | 1/2003 | Creamer et al. | |
| 2003/0078981 | A1 * | 4/2003 | Harms et al. ................ | 709/206 |
| 2003/0158860 | A1 * | 8/2003 | Caughey ..................... | 707/200 |
| 2003/0163538 | A1 | 8/2003 | Yeh et al. | |
| 2004/0063432 | A1 * | 4/2004 | Borsan ....................... | 455/445 |
| 2004/0078488 | A1 | 4/2004 | Patrick | |
| 2004/0158611 | A1 * | 8/2004 | Daniell et al. ............... | 709/206 |
| 2004/0236749 | A1 | 11/2004 | Cortright et al. | |
| 2004/0249894 | A1 | 12/2004 | Nishimura | |
| 2005/0003800 | A1 | 1/2005 | Yugami | |
| 2005/0198144 | A1 * | 9/2005 | Kraenzel et al. ............. | 709/206 |
| 2008/0208812 | A1 * | 8/2008 | Quoc et al. .................. | 707/3 |

FOREIGN PATENT DOCUMENTS

EP 1209929 A2 5/2002
WO WO 2005006165 A1 1/2005

* cited by examiner

Primary Examiner—Ramy M Osman
(74) Attorney, Agent, or Firm—Alston & Bird LLP

(57) ABSTRACT

A terminal and computer program product allow a user of a communication device to quickly reply to a received email message using any one of several different communication methods. Communication identifiers, such as email addresses and telephone numbers, are automatically retrieved from anywhere in the received email message and the retrieved communication identifiers are matched to the user's contact list. A list is then generated comprising those contacts for which the extracted communication identifiers match the communication identifiers from the contacts and also comprising the extracted communication identifiers if the extracted communication identifiers do not match the communication identifiers from any contacts. This list is displayed to the user who can then select one or more contacts and/or communication identifiers. The use can then choose to reply to those selected using any one of the available communication methods.

42 Claims, 6 Drawing Sheets

TERMINAL AND COMPUTER PROGRAM PRODUCT FOR REPLYING TO AN EMAIL MESSAGE USING ONE OF A PLURALITY OF COMMUNICATION METHODS

FIELD OF THE INVENTION

The present invention generally relates to email messaging and, more particularly, relates to a terminal and computer program product for replying to email messages using any one of several different communication methods.

BACKGROUND OF THE INVENTION

Many devices, such as mobile telephones, personal computers (PCs), handheld computers, and personal digital assistants (PDAs), enable communications using more than one communication method. A single device may enable a user to communicate by email, by telephone, by instant messaging (IM), and by text messaging (also called short messaging service or SMS), or any combination thereof. For example, a mobile telephone will often allow a user to communicate by email, IM, and SMS, in addition to communicating by telephone. Additionally, a PC will often allow a user to communicate by email, by IM, and by telephone (using voice over internet protocol (VOIP)).

Having the ability to communicate using any one of several different communication methods is very useful and efficient, however it can present some difficulties as the different communication methods do not always integrate seamlessly. A user may receive a communication via one method but may wish to reply to the sender using a different method. For example, a user may receive an email message on the user's mobile telephone, but the user may wish to reply to the sender by telephone because the user needs to communicate in real-time with the sender due to an urgent situation. In such a situation, a user would typically need to close the email application, open the user's contact list to determine the sender's telephone number, and then place a telephone call to the sender. If the sender is not listed in the user's contact list, but the sender included the sender's telephone number in the email message, then the user would typically need to read and remember the telephone number, close the email application, and then place a telephone call to the sender. Even when the sender is listed in the user's contact list, the contact list may not include the sender's telephone number. The user may not realize the sender's telephone number is not in the contact list until the user has opened the contact list, thus the user would have wasted time looking for something that is not in the contact list. The user might then need to open the email message again to determine the sender's telephone number, read and remember the telephone number, close the email application again, and place a telephone call to the sender. This current method can be very time consuming and inefficient. Similar difficulties exist if the user has received an email message but wants to reply to the sender using IM or SMS.

Some mobile telephones may have the capability to initiate a telephone to call, upon request by a user, to a telephone number that is present in a text message or an email message. However, in many situations the telephone number of the sender of the text message or email message will not be present in the message. Additionally, the telephone numbers of other recipients of the message are seldom present in the message. As such, this capability does not provide a reliable method of replying to a text or email message by telephone. Additionally, this capability does not allow a user to reply to a text or email message by a communication method other than telephone.

Greater difficulties are encountered if the user wants to reply not only to the sender, but also to other people who received the message, or to people mentioned in the message, using a different communication method. For example, an email message may have originated with a first person and have been sent to a second person, and this second person may have forwarded the email message to the user, with a copy ("cc") to a third person. The original email message may have included a reference to a fourth person in the body of the message, perhaps giving the fourth person's IM screen name. The user may desire to place a telephone conference call to the first, second, third, and fourth persons who sent, forwarded, received, and were referenced in, respectively, this chain of messages. This would typically entail the user performing the steps discussed above, but the user would have to perform these steps for each of the four persons with whom the user wishes to communicate. The difficulties and inefficiencies discussed above would be greatly magnified by needing to perform the steps multiple times.

Even if the user simply desires to reply to the email message using email but wants all four people to receive copies, other difficulties are encountered. In a typical email application, if the user were to select the option to send a reply-all message, such a reply-all message would only be sent to the people in the message header of the message received by the user (in the above example that would be the second person who forwarded the message to the user and the third person who received a copy of the forwarded message). If the user desired to send the reply message to the first person (the original message sender) and the fourth person (the person referenced in the body of the original message), the user would typically have to manually add the first and fourth persons' email addresses to the header of the reply message. The first person's email message would be listed in the header of the original message and, as such, would be relatively easy for the user to obtain in order to add the first person's address to the reply message (although it would need to be manually added). The fourth person's email address would have to be located in the user's contact list and manually added to the reply message. It should be appreciated that if the user desired to send a reply-all message to a large number of people who were not in the header of the message received by the user but rather listed in headers further down the chain of messages, or even merely mentioned in the body of any of the messages in the chain, this would be extremely difficult and time consuming as many names would need to be manually located and added to the reply-all message.

As such, there is a need for a user of a communication device to be able to quickly and easily reply to any person referenced in a received email message using any communication method supported by the communication device.

BRIEF SUMMARY OF THE INVENTION

A terminal and computer program product are therefore provided that allow a user of a communication device to quickly reply to a received email message using any one of several different communication methods by automatically retrieving communication identifiers, such as email addresses and telephone numbers, from anywhere in the received email message, matching the retrieved communication identifiers to the user's contact list, and allowing the user to select the communication method with which to reply.

In one embodiment of the invention, a terminal adapted to enable communication by a user using a plurality of communication applications comprises a display, a memory, and a processor. The display is capable of visually displaying email messages. The memory is capable of storing a contact list, with the contact list comprising a proper name and at least one contact, the at least one contact comprising at least one communication identifier, and the communication identifier selected from the group consisting of telephone number, email address, and instant messaging (IM) screen name. The processor is capable of executing an email application, parsing a received email message to extract at least one communication identifier from the email message, and determining if the extracted communication identifier matches the communication identifier from any of the contacts in the contact list.

In one embodiment of the invention, the processor is further capable of generating a list comprising a contact for which the extracted communication identifier matches a communication identifier from the contact and also comprising the extracted communication identifier if the extracted communication identifier does not match a communication identifier from a contact. In this embodiment, the display is capable of displaying the generated list.

In one embodiment of the invention, the processor is further capable of extracting at least one proper name from the email message, and determining if the extracted proper name matches the proper name from any of the contacts in the contact list.

In one embodiment of the invention, the processor is further capable of executing a telephony application. The processor is capable of generating a list comprising a contact for which the extracted communication identifier matches the communication identifier from the contact and for which the contact comprises a telephone number and the list also comprises the extracted communication identifier if the extracted communication identifier does not match the communication identifier from a contact and if the extracted communication identifier is a telephone number. The processor generates the list in response to a selection by the user to reply to the email message by telephone. The display is capable of displaying the generated list. The processor is also capable of initiating a telephone call in response to a selection by the user of a contact in the generated list, and capable of initiating a telephone call in response to a selection by the user of a communication identifier in the generated list.

In one embodiment of the invention, the processor is further capable of initiating a telephone conference call in response to a selection by the user of at least two contacts in the generated list, or in response to a selection by the user of at least one contact in the generated list and at least one communication identifier in the generated list, or in response to a selection by the user of at least two communication identifiers in the generated list.

In one embodiment of the invention, the processor is further capable of determining a time of day at a location where the initiated telephone call will be received and alerting the user if the time of day is within a predefined time range.

In one embodiment of the invention, the processor is capable of executing an IM application. In this embodiment, the processor is also capable of generating a list comprising a contact for which the extracted communication identifier matches a communication identifier from the contact and for which the contact comprises an IM screen name. The processor generates the list in response to a selection by the user to reply to the email message by instant message. The processor is further capable of initiating an instant message in response to a selection by the user of a contact in the generated list.

In one embodiment of the invention, the processor is further capable of determining a presence status of the contact in the generated list and providing an indication to the user of the presence status of the contact in the generated list.

In one embodiment of the invention, the processor is capable of executing an IM application. In this embodiment, the processor is also capable of generating a list comprising a contact for which the extracted communication identifier matches a communication identifier from the contact and for which the contact comprises an IM screen name. The processor generates the list in response to a selection by the user to reply to the email message by chat request. The processor is further capable of initiating at least one invitation to participate in an on-line chat in response to a selection by the user of at least one contact in the generated list.

In one embodiment of the invention, the processor is further capable of executing a text messaging application. In this embodiment, the processor is further capable of generating a list comprising a contact for which the extracted communication identifier matches a communication identifier from the contact and for which the contact comprises a telephone number, where the list further comprises the extracted communication identifier if the extracted communication identifier does not match a communication identifier from a contact and if the extracted communication identifier is a telephone number. The processor generates the list in response to a selection by the user to reply to the email message by text message. The processor is further capable of initiating a text message in response to a selection by the user of a contact in the generated list, or in response to a selection by the user of a communication identifier in the generated list.

In one embodiment of the invention, the processor is capable of generating a list comprising a contact for which the extracted communication identifier matches a communication identifier from the contact and for which the contact comprises an email address, where the list further comprises the extracted communication identifier if the extracted communication identifier does not match a communication identifier from a contact and if the extracted communication identifier is an email address. The processor generates the list in response to a selection by the user to reply to the email message by email message. The processor is further capable of initiating an email message in response to a selection by the user of a contact in the generated list, and in response to a selection by the user of a communication identifier in the generated list.

In one embodiment of the invention, the processor is capable of generating a list comprising a contact for which the extracted communication identifier matches a communication identifier from the contact and for which the contact comprises an email address, where the list further comprises the extracted communication identifier if the extracted communication identifier does not match a communication identifier from a contact and if the extracted communication identifier is an email address. The processor generates the list in response to a selection by the user to reply to the email message with a meeting request. The processor is further capable of initiating at least one meeting request in response to a selection by the user of at least one contact in the generated list. The processor is further capable of initiating at least two meeting requests in response to a selection by the user of at least one contact in the generated list and at least one communication identifier in the generated list. The processor is further capable of initiating at least one meeting request in response to a selection by the user of at least one communication identifier in the generated list.

In one embodiment of the invention, the processor is capable of generating a list comprising a contact for which the extracted communication identifier matches a communication identifier from the contact and for which the contact comprises an email address, where the list further comprises the extracted communication identifier if the extracted communication identifier does not match a communication identifier from a contact and if the extracted communication identifier is an email address. The processor generates the list in response to a selection by the user to reply to the email message with an online meeting request. The processor is further capable of initiating at least one online meeting request in response to a selection by the user of at least one contact in the generated list. The processor is further capable of initiating at least two online meeting requests in response to a selection by the user of at least one contact in the generated list and at least one communication identifier in the generated list. The processor is further capable of initiating at least one online meeting request in response to a selection by the user of at least one communication identifier in the generated list.

In one embodiment of the invention, the processor is capable of executing an IM application. In this embodiment, the processor is further capable of generating a list comprising a contact for which the extracted communication identifier matches a communication identifier from the contact and for which the contact comprises an IM screen name. The processor generates the list in response to a selection by the user to reply to the email message with a meeting request. The processor is further capable of initiating at least one meeting request in response to a selection by the user of at least one contact in the generated list.

In addition to the terminal for replying to a received email message using any one of several different communication methods described above, other aspects of the present invention are directed to corresponding methods and computer program products for replying to a received email message using any one of several different communication methods.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The terminal and computer program product of embodiments of the present invention will be primarily described in conjunction with mobile communications applications, and in particular mobile telephones. It should be understood, however, that the terminal and computer program product of embodiments of the present invention can be utilized in conjunction with a variety of other applications, both in the mobile communications industries and outside of the mobile communications industries. For example, the terminal and computer program product of embodiments of the present invention can be utilized in conjunction with wireline and/or wireless network (e.g., Internet) applications. Additionally, the terminal and computer program product of embodiments of the present invention can be utilized in conjunction with any other devices capable of executing an email application and communicating using at least one other communication method, including but not limited to personal computers, laptop computers, handheld computers, and personal digital assistants.

Figure 1:
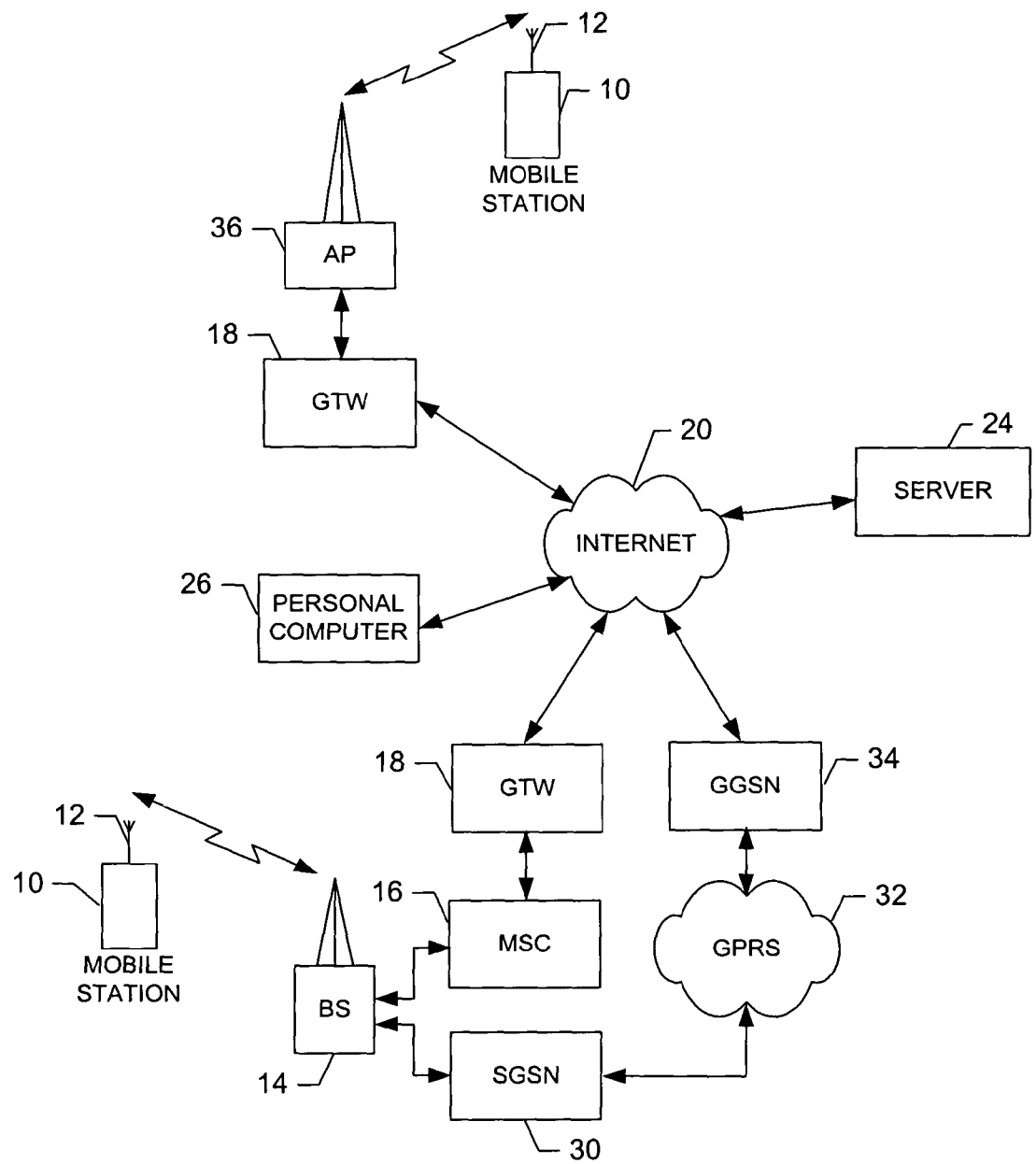
FIG. 1 is a block diagram of one type of system that would benefit from embodiments of the present invention.

As shown in FIG. 1 by way of example, an illustration of one type of system that would benefit from the present invention is provided. The system can include one or more mobile stations 10, each having an antenna 12 for transmitting signals to and for receiving signals from one or more base stations (BS's) 14. The base station is a part of one or more cellular or mobile networks that each includes elements required to operate the network, such as one or more mobile switching centers (MSC) 16. As well known to those skilled in the art, the mobile network may also be referred to as a Base Station/MSC/Interworking function (BMI). In operation, the MSC is capable of routing calls, data or the like to and from mobile stations when those mobile stations are making and receiving calls, data or the like. The MSC can also provide a connection to landline trunks when mobile stations are involved in a call.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a gateway (GTW) 18, and the GTW is coupled to a WAN, such as the Internet 20. In turn, devices such as processing elements (e.g., personal computers, server computers or the like) can be coupled to the mobile station 10 via the Internet. For example, as explained below, the processing elements can include one or more processing elements associated with one or more servers 24, personal computer (PC) systems 26, or the like, one of each being illustrated in FIG. 1 and described below. As will be appreciated, the processing elements can comprise any of a number of processing devices, systems or the like capable of operating in accordance with embodiments of the present invention.

The BS 14 can also be coupled to a signaling GPRS (General Packet Radio Service) support node (SGSN) 30. As known to those skilled in the art, the SGSN is typically capable of performing functions similar to the MSC 16 for packet switched services. The SGSN, like the MSC, can be coupled to a data network, such as the Internet 20. The SGSN can be directly coupled to the data network. In a more typical embodiment, however, the SGSN is coupled to a packet-switched core network, such as a GPRS core network 32. The packet-switched core network is then coupled to another GTW, such as a GTW GPRS support node (GGSN) 34, and the GGSN is coupled to the Internet.

Although not every element of every possible network is shown and described herein, it should be appreciated that the mobile station 10 may be coupled to one or more of any of a number of different networks. In this regard, mobile network(s) can be capable of supporting communication in accordance with any one or more of a number of first-generation (1G), second-generation (2G), 2.5G and/or third-generation (3G) mobile communication protocols or the like. More particularly, one or more mobile stations may be coupled to one or more networks capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. In addition, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrowband AMPS (NAMPS), as well as TACS, network(s) may also benefit from embodiments of the present invention, as should dual or higher mode mobile stations (e.g., digital/analog or TDMA/CDMA/analog phones).

One or more mobile stations 10 can further be coupled to one or more wireless access points (APs) 36. The AP's can be configured to communicate with the mobile station in accordance with techniques such as, for example, radio frequency (RF), Bluetooth (BT), infrared (IrDA) or any of a number of different wireless networking techniques, including WLAN techniques. The APs may be coupled to the Internet 20. Like with the MSC 14, the AP's can be directly coupled to the Internet. In one embodiment, however, the APs are indirectly coupled to the Internet via a GTW 18. As will be appreciated, by directly or indirectly connecting the mobile stations and the processing elements (e.g., servers 24, personal computer (PC) systems 26) and/or any of a number of other devices to the Internet, whether via the AP's or the mobile network(s), the mobile stations and processing elements can communicate with one another to thereby carry out various functions of the respective entities, such as to transmit and/or receive data, content or the like. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 1, in addition to or in lieu of coupling the mobile stations 10 to servers 24, personal computer (PC) systems 26 and the like across the Internet 20, one or more such entities may be directly coupled to one another. As such, one or more network entities may communicate with one another in accordance with, for example, RF, BT, IrDA or any of a number of different wireline or wireless communication techniques, including LAN and/or WLAN techniques.

As will be appreciated, a number of the entities of the system of FIG. 1 can be configured in any of a number of different architectures to perform any of a number of functions. For example, the entities of the system of FIG. 1 can be configured in a centralized client-server architecture, decentralized architecture and/or proxy architecture. Additionally or alternatively, for example, the entities of the system of FIG. 1 can be configured in an architecture given in the Scalable Network Application Package (SNAP) (formerly Sega Network Application Package) provided by Nokia Corporation for applications such as in the context of gaming.

Figure 2:
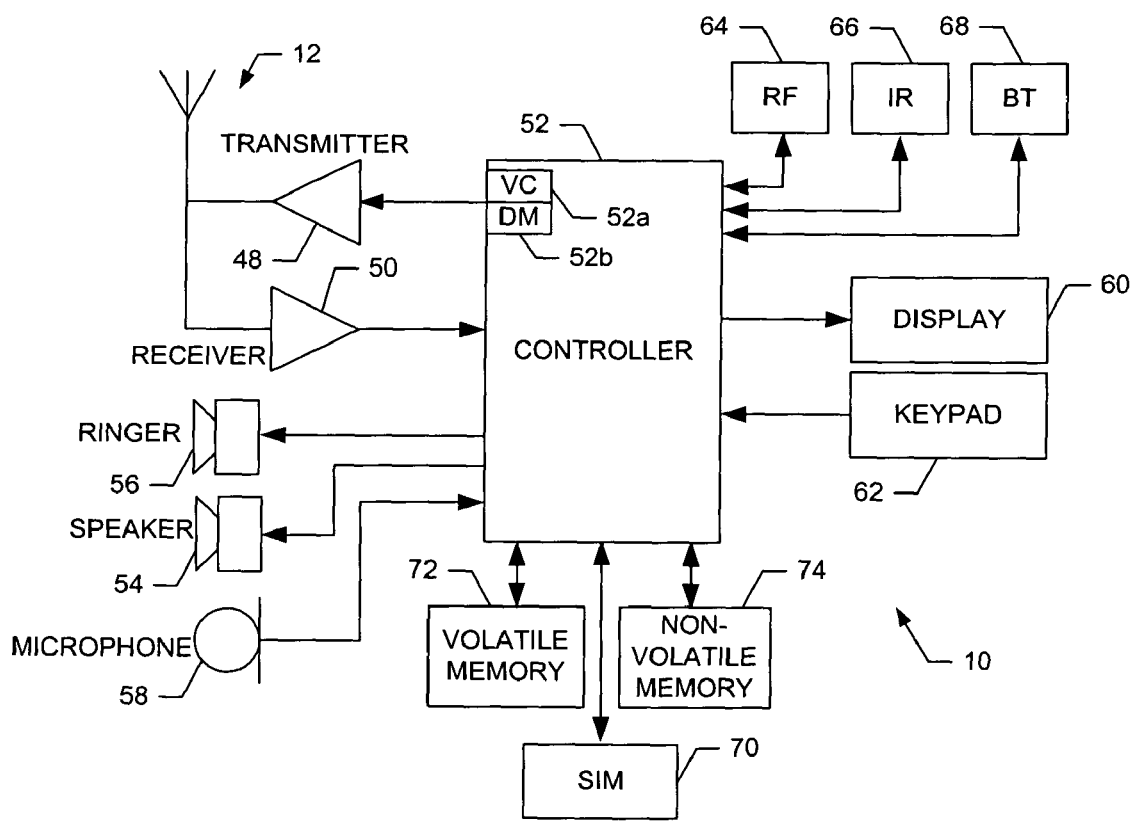
FIG. 2 is a schematic block diagram more particularly illustrating a mobile station in accordance with one embodiment of the present invention.

Reference is now made to FIG. 2, which illustrates one type of mobile station 10, a mobile telephone, which would benefit from embodiments of the present invention. It should be understood, however, that the mobile station illustrated and hereinafter described is merely illustrative of one type of mobile station that would benefit from the present invention and, therefore, should not be taken to limit the scope of the present invention. While several embodiments of the mobile station are illustrated and will be hereinafter described for purposes of example, other types of mobile stations, such as portable digital assistants (PDAs), two-way pagers, laptop computers, handheld computers and other types of electronic systems, can readily employ the present invention. Additionally, it should be appreciated that terminals other than mobiles stations, such as personal computers, can readily employ the present invention.

As shown, in addition to an antenna 14, the mobile station 10 can include a transmitter 48, receiver 50, and controller 52 or other processor that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of first generation (1G), second generation (2G), 2.5G and/or third-generation (3G) communication protocols or the like. For example, the mobile station may be capable of operating in accordance with 2G wireless communication protocols IS-136 (TDMA), GSM, and IS-95 (CDMA). Also, for example, the mobile station may be capable of operating in accordance with 2.5G wireless communication protocols GPRS, EDGE, or the like. Further, for example, the mobile station may be capable of operating in accordance with 3G wireless communication protocols such as UMTS network employing WCDMA radio access technology. Some NAMPS, as well as TACS, mobile stations may also benefit from the teaching of this invention, as should dual or higher mode phones (e.g., digital/analog or TDMA/CDMA/analog phones).

It is understood that the controller 52 includes the circuitry required for implementing the audio and logic functions of the mobile station 10. For example, the controller may be comprised of a digital signal processor device, a microprocessor device, and various analog-to-digital converters, digital-to-analog converters, and other support circuits. The control and signal processing functions of the mobile station are allocated between these devices according to their respective capabilities. The controller can additionally include an internal voice coder (VC) 52a, and may include an internal data modem (DM) 52b. Further, the controller may include the functionality to operate one or more client software programs such as those indicated above, which may be stored in memory (described below).

The mobile station 10 also comprises a user interface including a conventional earphone or speaker 54, a ringer 56, a microphone 58, a display 60, and a user input interface, all of which are coupled to the controller 52. Although not shown, the mobile station can include a battery for powering the various circuits that are required to operate the mobile station, as well as optionally providing mechanical vibration as a detectable output. The user input interface, which allows the mobile station to receive data, can comprise any of a number of devices allowing the mobile station to receive data, such as a keypad 62, a touch display (not shown), a joystick (not shown) or other input device. In embodiments including a keypad, the keypad includes the conventional numeric (0-9) and related keys (#, *), and other keys used for operating the mobile station. For instant messaging applications, the keypad 62 may include a full QWERTY or other alphanumeric keyboard.

The mobile station 10 can also include one or more means for sharing and/or obtaining data. For example, the mobile station can include a short-range radio frequency (RF) transceiver or interrogator 64 so that data can be shared with and/or obtained from electronic devices in accordance with RF techniques. The mobile station can additionally, or alternatively, include other short-range transceivers, such as, for example an infrared (IR) transceiver 66, and/or a Bluetooth (BT) transceiver 68 operating using Bluetooth brand wireless technology developed by the Bluetooth Special Interest Group. The mobile station can therefore additionally or alternatively be capable of transmitting data to and/or receiving data from electronic devices in accordance with such techniques. Although not shown, the mobile station can additionally or alternatively be capable of transmitting and/or receiving data from electronic devices according to a number of different wireless networking techniques, including WLAN techniques such as IEEE 802.11 techniques or the like.

The mobile station 10 can further include memory, such as a subscriber identity module (SIM) 70, a removable user identity module (R-UIM) or the like, which typically stores information elements related to a mobile subscriber. In addition to the SIM, the mobile station can include other removable and/or fixed memory. In this regard, the mobile station can include volatile memory 72, such as volatile Random Access Memory (RAM) including a cache area for the temporary storage of data. The mobile station can also include other non-volatile memory 74, which can be embedded and/or may be removable. The non-volatile memory can additionally or alternatively comprise an EEPROM, flash memory or the like. The memories can store any of a number of software applications, instructions, pieces of information, and data, used by the mobile station to implement the functions of the mobile station.

Figure 3:
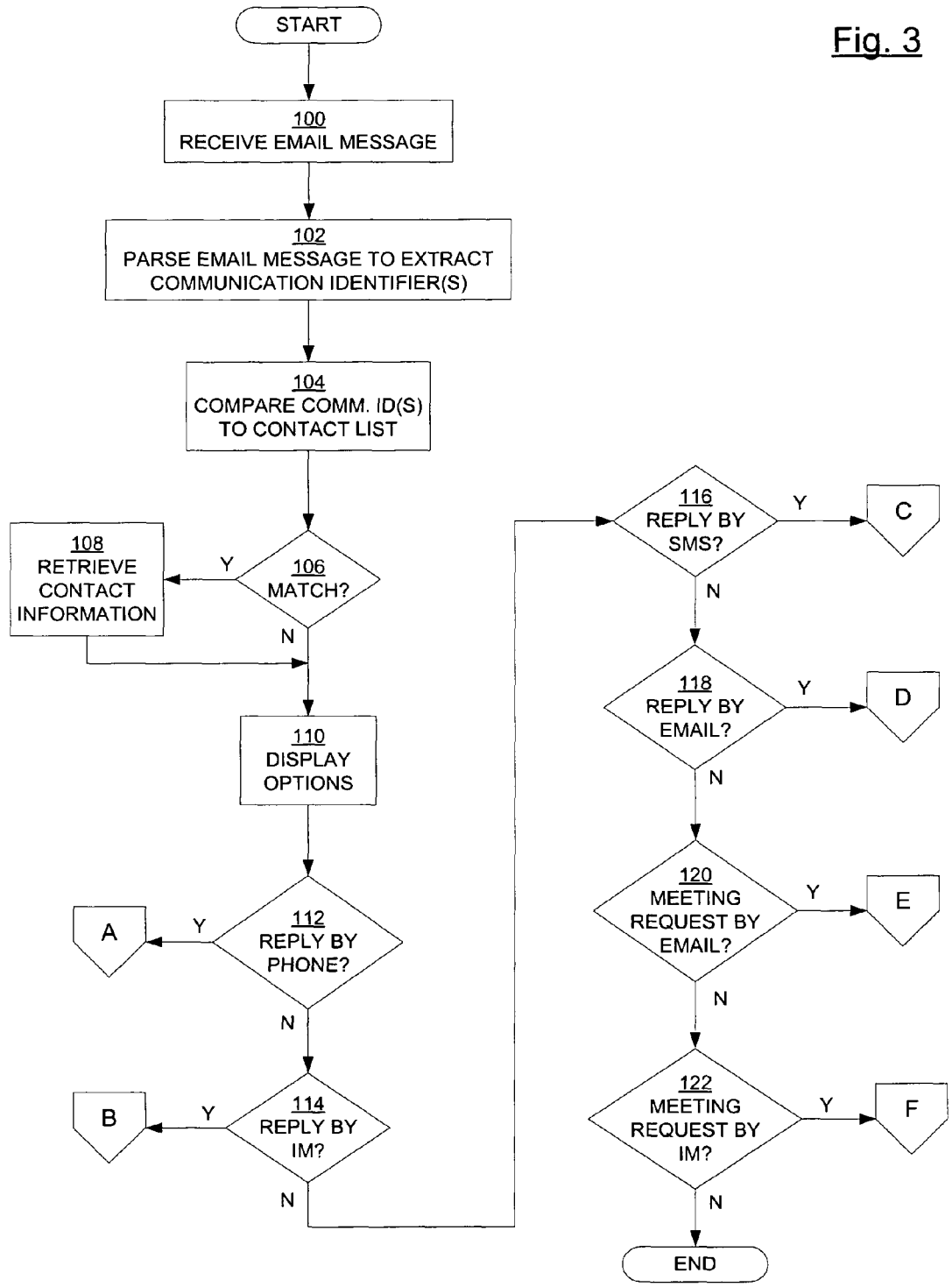
FIGS. 3-3F is a flowchart of the operation of replying to an email message using one of a plurality of communication applications, in accordance with one embodiment of the present invention.
Figure 3A:
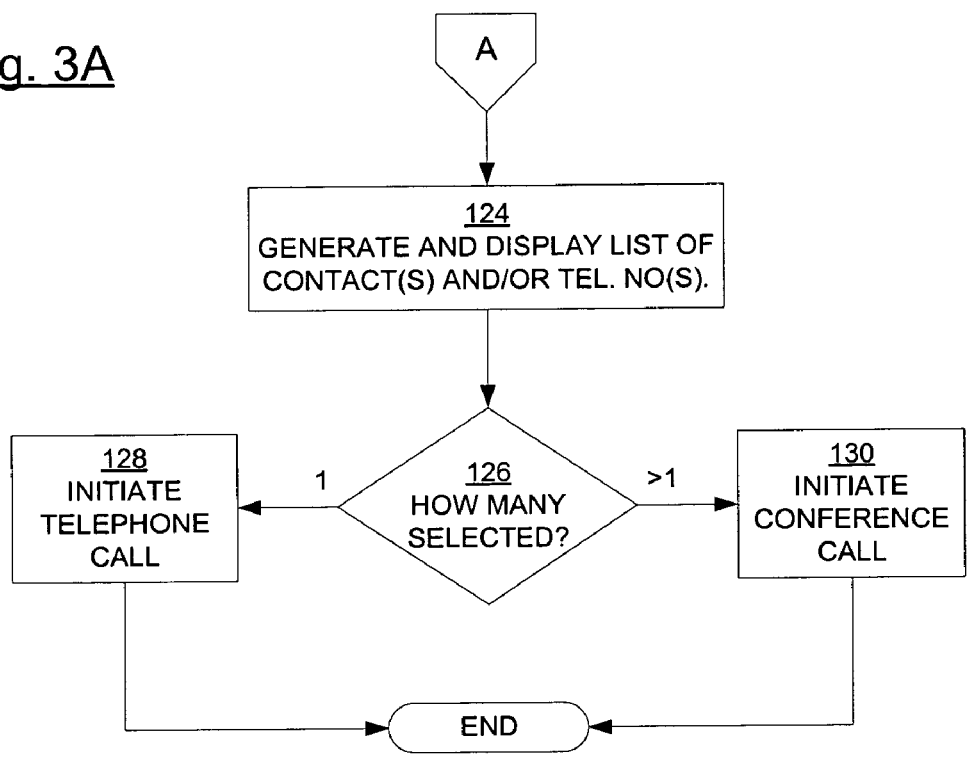
Figure 3B:
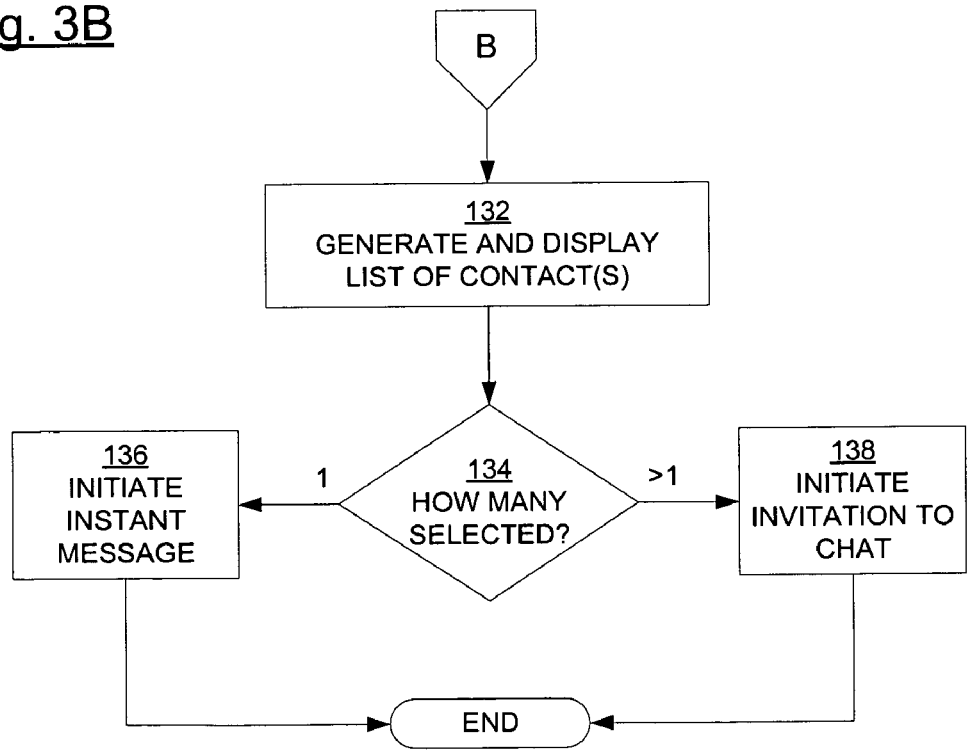
Figure 3C:
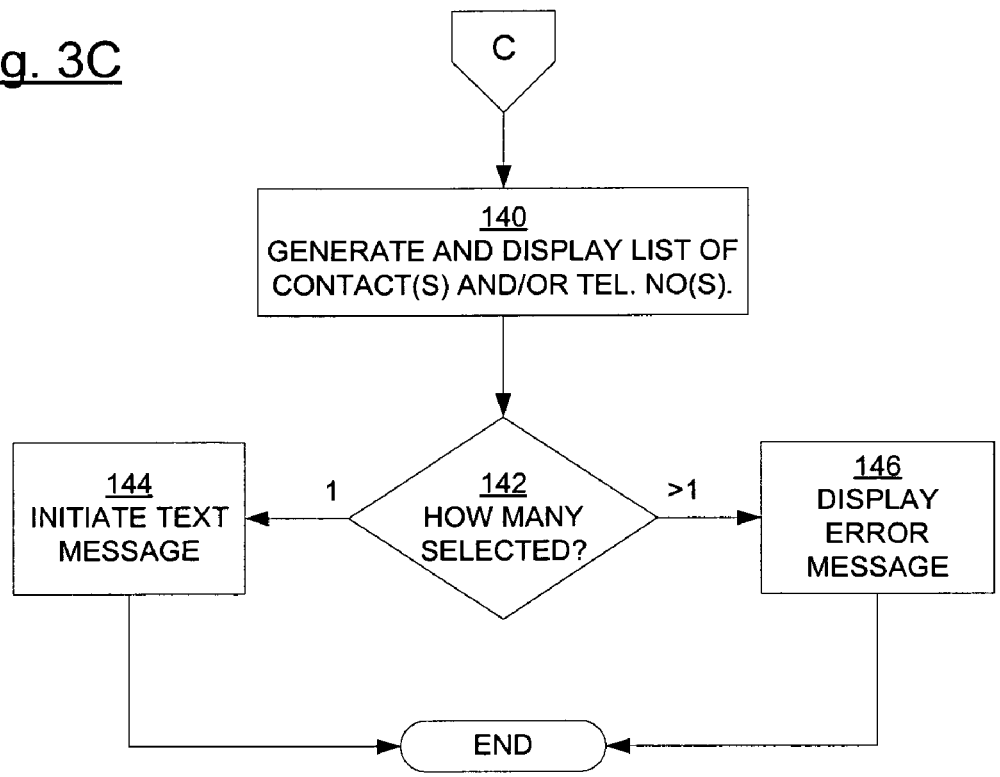
Figure 3D:
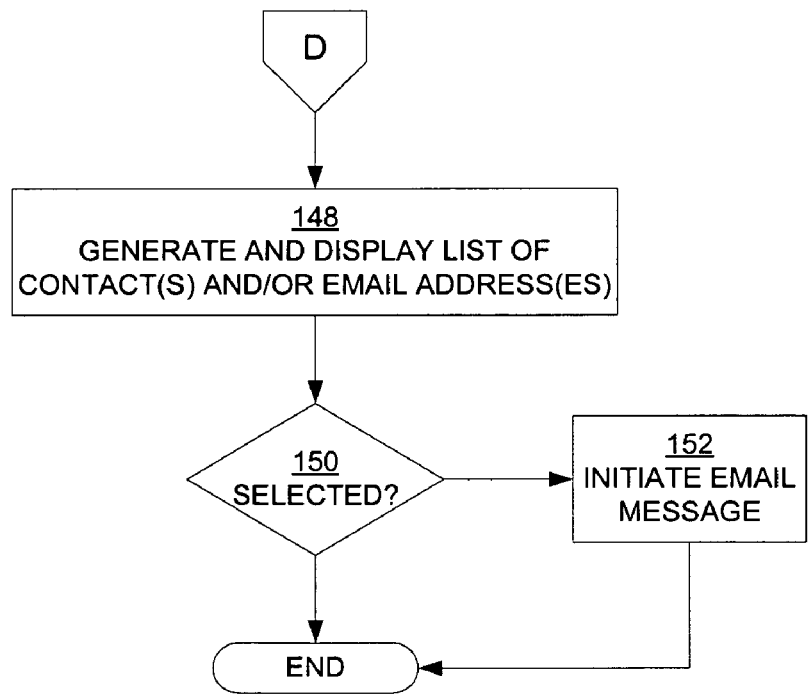
Figure 3E:
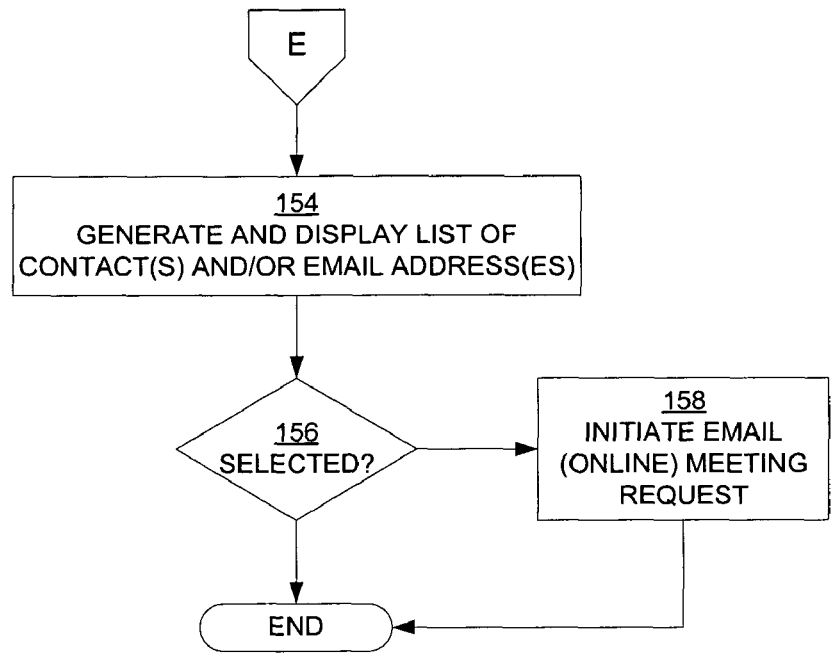
Figure 3F:
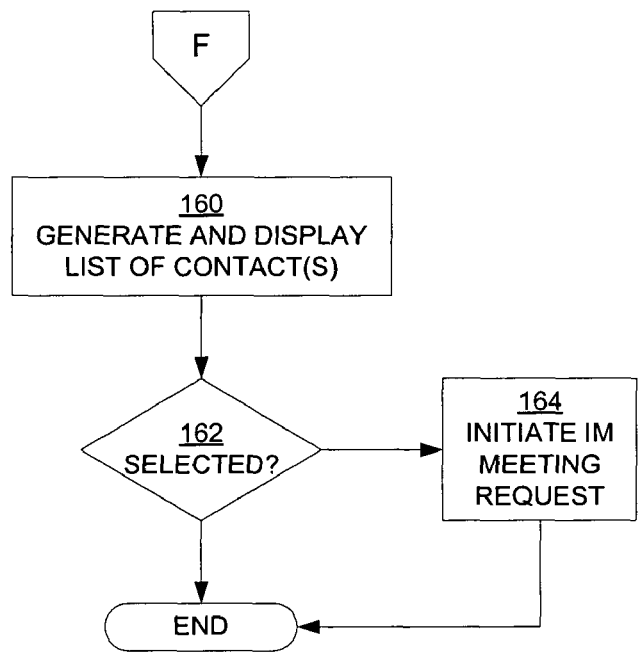

Reference is now made to FIGS. 3-3F, which illustrates a flowchart of the operation of replying to an email message using one of a plurality of communication applications, in accordance with one embodiment of the present invention. As shown in block 100 of FIG. 3, the processor of the terminal of the present invention would typically receive an email message directed to the user of the present invention. The email message may have been addressed directly to the user (i.e., the user's email address is in the "to" field of the email header) or the user may have received a copy of the email message (i.e., the user's email address is in the "cc" field of the email header). The email message may have other email addresses of other recipients listed in the "to" field or in the "cc" field. The email message may be a "chain" of two or more email messages. That is, the email message received by the user may include one or more other email messages appended within the body of the received email message. These appended email messages will typically also have headers. The headers in the appended messages may include "to" fields and "cc" fields with email addresses, and these email addresses may be the same as or different than the email addresses in the header of the received email address. The received email message may also have other email addresses within the body of the email message, in addition to the email addresses within the header(s). For example, the sender may include another person's email address in the body of the message sent to the user with a suggestion that the user contact this other person.

Communication identifiers typically are predefined strings of characters (e.g., letters, numbers, symbols, or some combination thereof) used by a creator of a communication message (e.g., email message, telephone call, instant message, text message) to indicate the intended destination of the message, and used by a communication system to direct the communication message to the intended destination. The intended destination is typically a predefined communication device or a predefined user of a communication device. Communication identifiers include, but are not limited to, email addresses, telephone numbers, and IM screen names. In addition to the email addresses which may be present in the received email message, other communication identifiers may appear in the body of the received email message. For example, the sender of the email message may add a "signature" (i.e., a predefined set of contact information for the sender) that includes the sender's telephone number.

As shown in block 102 of FIG. 3, the processor of the terminal would typically parse the received email message to extract all of the communication identifiers that are present anywhere in the message. As discussed above, this would typically include any email addresses present in any of the headers or in the body of the message, and any telephone numbers present in the body of the message. Email addresses would typically be identified by searching the email message for text strings having the format of "username@domainname.domaintype." Telephone numbers would typically be identified by searching the email message for numeric strings having a valid telephone number format, such as "(000)000-0000" or "000-000-0000" for telephone numbers in the United States, or any valid international telephone number format. In one embodiment of the invention, telephone numbers may be identified by searching for numeric strings having the format of "000-0000," and the processor of the present invention may presume that the area code for such a telephone number is the same as the area code of the user's telephone number.

As the processor of the terminal is extracting all of the communication identifiers from the received email message, the processor would typically discard duplicate communication identifiers. For example, if the same email address is referenced multiple times in multiple message headers within the body of the received email message, the processor would typically retain only one instance of that email message for use in the rest of the process. Similarly, the processor of the terminal would likely discard any extracted communication identifiers associated with the user of the terminal, as the user generally does not desire to send a reply message the user.

After all communication identifiers within the received email message have been identified, the next step typically would be to compare each of these communication identifiers to the user's contact list to identify matches, as shown in block 104 of FIG. 3. A user would typically have a contact list stored in the memory of the user's communication terminal or in a remote memory, such as in a server accessible by the terminal. A contact list typically comprises a number of individual contacts, with each individual contact typically comprising specific contact information for one person or other entity (e.g., corporate entity). Each contact is typically identified by the name of the person or entity whose information is in that specific contact, and each contact may have one or more physical addresses (e.g., business street address, business mailing address, and/or home address), one or more telephone numbers (e.g., business, personal, home, mobile, and/or fax), one or more email addresses (e.g., business and/or personal), and one or more IM screen names.

As each communication identifier is compared to each contact in the user's contact list, when a match is identified, as determined in block 106, the contact information is retrieved, as shown in block 108. Typically, the contact information that is retrieved would be the contact name and any communication identifiers in that specific contact. For example, if the processor of the terminal has extracted a telephone number from a received email message, it will search for any contacts in the user's contact list that contains that telephone number. If a contact is located that contains that telephone number, the processor of the terminal would typically retrieve the contact name, any other telephone numbers in the contact, any email addresses in the contact, and any screen names in the contact.

In addition to extracting communication identifiers, the processor of the terminal may extract proper names (e.g., "John Smith" or "Acme Corporation") from the received email message as in block 102, compare the extracted proper name against the user's contact list as in block 104, and retrieve the contact information when the extracted proper name matches a name in any of the contacts as in block 108. Advantageously, this may allow the user to reply to an entity that is mentioned by name in the body of the received email message if that entity is in the user's contact list.

The next step typically would be to display to the user all available options for replying to the received email message, as shown in block 110. The options would typically be displayed after the user has taken some action, such as pressing a "reply" key or pressing a "menu" key on the terminal. The options that may be displayed to the user will typically vary depending on the specific embodiment of the invention, but may include the following options: (1) reply by telephone; (2) reply by IM; (3) reply by text message; (4) reply by email; (5) send meeting request by email; (6) send online meeting request by email; and (7) send meeting request by IM. The options displayed would generally be limited by the communication methods supported by the terminal. For example, if the terminal did not support IM, the processor of the terminal would not typically display options (2) or (7) above. It should be appreciated that the step of displaying the available options as illustrated in block 110 could be performed prior to parsing the email message to extract communication identifiers. In one embodiment of the invention, all options that the processor of the terminal is capable of performing would be displayed. In an alternative embodiment, only those options that can be performed on a specific received email message will be displayed. For example, if the processor of the terminal was not able to extract any telephone numbers from a particular received email message and if the processor was not able to match any communication identifiers within the particular email message to any contacts containing a telephone number, then it would not be possible to reply to that particular email message by telephone. As such, the processor of the terminal may not display those options that use telephone to reply, such as option (1) above.

It should be appreciated that the order in which the available options are displayed may vary, depending on the specific embodiment of the invention. In one embodiment, the available options may be displayed in alphabetical order. In an alternative embodiment, the available options may be displayed in order according to the number of people that each option provides the ability to contact. For example, if steps 102 through 108 identified email addresses for five people, identified telephone numbers for three people, and identified IM screen names for two people, the processor of the terminal may list the available options in the following order: (1) reply by email; (2) send meeting request by email; (3) send online meeting request by email; (4) reply by telephone; (5) reply by text message; (6) reply by IM; and (7) send meeting request by IM. As such, the user can readily determine which reply method is likely to reach the greatest number of people.

After the available reply options have been displayed to the user, the user will typically select one of the options. Which option is selected by the user is determined in blocks 112 to 122 of FIG. 3. In block 112, it is determined if the user has selected the option to reply by telephone. If this option is selected, the processor of the terminal will typically perform the steps illustrated in FIG. 3A. In block 114, it is determined if the user has selected the option to reply by IM. If this option is selected, the processor of the terminal will typically perform the steps illustrated in FIG. 3B. In block 116, it is determined if the user has selected the option to reply by text message or SMS. If this option is selected, the processor of the terminal will typically perform the steps illustrated in FIG. 3C. In block 118, it is determined if the user has selected the option to reply by email. If this option is selected, the processor of the terminal will typically perform the steps illustrated in FIG. 3D. In block 120, it is determined if the user has selected the option to reply by sending a meeting request by email. If this option is selected, the processor of the terminal will typically perform the steps illustrated in FIG. 3E. Requests for two types of meetings may generally be sent. One type of meeting is a physical meeting. Another type of meeting is an online meeting, such as that conducted using meeting software such as NetMeeting® or Sametime®. (NetMeeting is a registered trademark of Microsoft Corporation; Sametime is a registered trademark of IBM Corporation). As the method of replying to an email message by sending a meeting request is very similar regardless of whether it is a physical meeting or an online meeting, these two types of meeting requests will be discussed together in block 120 and FIG. 3E. In block 122, it is determined if the user has selected the option to reply by sending a meeting request by IM. If this option is selected, the processor of the terminal will typically perform the steps illustrated in FIG. 3F. It should be appreciated that a user might not select any of these options, and as such the processor of the terminal would not take any actions.

If it is determined in block 112 of FIG. 3 that the user has selected the option to reply by telephone, the processor of the terminal will typically generate and display a list of contacts and/or telephone numbers, as illustrated in block 124 of FIG. 3A. This list will typically comprise any contacts that contain a communication identifier that matches one of the communication identifiers extracted from the received email message and that contains a telephone number for the contact. For example, the received email may have contained an email address for a particular person. If that particular person is in the user's contact list, and that person's email address and telephone number are in the contact, then the contact will be displayed in the generated list. If that particular person is in the user's contact list, and that person's email address is in the contact but that person's telephone number is not in the contact, then the contact will typically not be displayed in the generated list because the terminal will not be able to place a telephone call to that person. The generated list will typically also comprise any telephone numbers that were extracted from the received email message but did not match any telephone numbers in any of the contacts. Even though such a telephone number does not match any of the contacts, the processor of the terminal can still initiate a telephone call to such a telephone number if selected by the user.

In an alternative embodiment of the present invention, the generated and displayed list may include communication identifiers that were extracted from the received email message but which did not match to a contact containing a telephone number. Even though the processor of the terminal cannot initiate a telephone call to such a communication identifier, this allows the user to see all of the extracted communication identifiers and understand how many will not be able to be contacted by telephone.

After the list has been generated and displayed, the user would typically select one or more contacts and/or telephone numbers from the list. The user would select the contacts and/or telephone numbers of those people with whom the user wishes to speak via telephone. In block 126 it is determined how many contacts and/or telephone numbers the user selected. If the user selected one contact or one telephone number, then the processor of the terminal would typically initiate a telephone call to that contact or telephone number, as illustrated in block 128. If the user selected at least two contacts, at least two telephone numbers, or at least one contact and at least one telephone number, then the processor of the terminal would typically initiate a telephone conference call to those contacts and/or telephone numbers, as illustrated in block 130. The term "telephone call" as used herein includes, but is not limited to, calls placed over wired or landline systems, calls placed over wireless or mobile systems, calls placed using voice over IP protocol (VOIP), and calls placed using push-to-talk functionality included in many mobile telephones.

In one embodiment of the present invention, the processor of the terminal may determine the time of day at the location of the telephone number to be called and alert the user that the time of day is not within a predefined range of an acceptable time to call. The processor of the terminal may determine the time of day at the location of the telephone number to be called by cross-referencing the area code (or city and country code for international calls) against a database of area codes (or city and country codes) and corresponding time zones. Alternatively, the processor of the terminal may determine the time of day at the location of the telephone number to be called by cross-referencing the city, state, country, and/or zip/postal code in the contact corresponding to the telephone number against a database of cities, states, countries, and/or zip/postal codes and corresponding time zones. In this embodiment, the user may define a time range, for example 10:00 PM to 7:00 AM, such that the processor of the terminal will alert the user if the time of day at the location of the telephone number to be called is within the defined time range. Alternatively, the time range may be set to default values which the user may modify if desired or may choose to leave unmodified. Advantageously, this embodiment may prevent a user from inadvertently calling someone referenced in the received email message at a time of day when that person is likely to be asleep.

If it is determined in block 114 of FIG. 3 that the user has selected the option to reply by instant message, the processor of the terminal will typically generate and display a list of contacts, as illustrated in block 132 of FIG. 3B. This list will typically comprise any contacts that contain a communication identifier that matches one of the communication identifiers extracted from the received email message and that contains an IM screen name for the contact. For example, the received email may have contained an email address for a particular person. If that particular person is in the user's contact list, and that person's email address and IM screen name are in the contact, then the contact will be displayed in the generated list. If that particular person is in the user's contact list, and that person's email address is in the contact but that person's IM screen name is not in the contact, then the contact will typically not be displayed in the generated list because the terminal will not be able to initiate an instant message to that person. In one embodiment of the invention, the processor of the terminal may determine the presence status of the contacts in the displayed list and provide a visual indication of the presence status. The visual indication may be, for example, graying out the display of the contacts whose presence status indicates the contact is not available to receive an instant message. Alternatively, the visual indication may comprise symbols or icons displayed adjacent to each displayed contact, with each different symbol or icon indicating a different presence status.

In an alternative embodiment of the present invention, the generated and displayed list may include communication identifiers that were extracted from the received email message but which did not match to a contact containing an IM screen name. Even though the processor of the terminal cannot initiate an instant message to such a communication identifier, this allows the user to see all of the extracted communication identifiers and understand how many will not be able to be contacted by instant message.

After the list has been generated and displayed, the user would typically select one or more contacts from the list. The user would select the contacts of those people with whom the user wishes to communicate via IM. In block 134 it is determined how many contacts the user selected. If the user selected one contact, then the processor of the terminal would typically initiate an instant message to that contact, as illustrated in block 136. If the user selected at least two contacts, then the processor of the terminal would typically initiate instant messages inviting those selected contacts to participate in an online chat, as illustrated in block 138. When two or more contacts are selected from the list, an invitation is sent to participate in an online chat because IM generally does not support simultaneous communication with multiple people.

In one embodiment of the invention, the option to invite one or more people to participate in an online chat may be a separate option presented to the user in addition to the other options illustrated in FIG. 3.

In one embodiment of the present invention, the processor of the terminal may determine the presence status (e.g., online, offline, away from computer) of the IM screen name to which an instant message is to be sent and alert the user that the presence status of that IM screen name is such that the instant message will likely not be received. Advantageously, this embodiment may prevent a user from inadvertently sending an instant message to someone referenced in the received email message when that person is not likely to receive the instant message.

If it is determined in block 116 of FIG. 3 that the user has selected the option to reply by text message (i.e., SMS), the processor of the terminal will typically generate and display a list of contacts and/or telephone numbers, as illustrated in block 140 of FIG. 3C. Text messaging is typically conducted through a telephone service provider and, as such, the "address" used to direct a text message to the desired person is that person's telephone number. The generated list will typically comprise any contacts that contain a communication identifier that matches one of the communication identifiers extracted from the received email message and that contains a telephone number for the contact. For example, the received email may have contained an email address for a particular person. If that particular person is in the user's contact list, and that person's email address and telephone number are in the contact, then the contact will be displayed in the generated list. If that particular person is in the user's contact list, and that person's email address is in the contact but that person's telephone number is not in the contact, then the contact will typically not be displayed in the generated list because the terminal will not be able to initiate a text message to that person. The generated list will typically also comprise any telephone numbers that were extracted from the received email message but did not match any telephone numbers in any of the contacts. Even though such a telephone number does not match any of the contacts, the processor of the terminal can still initiate a text message to such a telephone number if selected by the user.

In an alternative embodiment of the present invention, the generated and displayed list may include communication identifiers that were extracted from the received email message but which did not match to a contact containing a telephone number. Even though the processor of the terminal cannot initiate a text message to such a communication identifier, this allows the user to see all of the extracted communication identifiers and understand how many will not be able to be contacted by text message.

After the list has been generated and displayed, the user would typically select one or more contacts and/or telephone numbers from the list. The user would select the contacts and/or telephone numbers of those people to whom the user wishes to send a text message. In block 142 it is determined how many contacts and/or telephone numbers the user selected. If the user selected one contact or one telephone number, then the processor of the terminal would typically initiate a text message to that contact or telephone number, as illustrated in block 144. If the user selected at least two contacts, at least two telephone numbers, or at least one contact and at least one telephone number, then the processor of the terminal would typically display an error message, as illustrated in block 130, because text messaging generally does not support simultaneous communications with more than one telephone number.

If it is determined in block 118 of FIG. 3 that the user has selected the option to reply by email message, the processor of the terminal will typically generate and display a list of contacts and/or email addresses, as illustrated in block 148 of FIG. 3D. This list will typically comprise any contacts that contain a communication identifier that matches one of the communication identifiers extracted from the received email message and that contains an email address for the contact. For example, the received email may have contained a telephone number for a particular person. If that particular person is in the user's contact list, and that person's telephone number and email address are in the contact, then the contact will be displayed in the generated list. If that particular person is in the user's contact list, and that person's telephone number is in the contact but that person's email address is not in the contact, then the contact will typically not be displayed in the generated list because the terminal will not be able to initiate an email message to that person. The generated list will typically also comprise any email addresses that were extracted from the received email message (either from a header or from the body of the message) but did not match any email addresses in any of the contacts. Even though such an email address does not match any of the contacts, the processor of the terminal can still initiate an email message to such an email address if selected by the user.

In an alternative embodiment of the present invention, the generated and displayed list may include communication identifiers that were extracted from the received email message but which did not match to a contact containing an email address. Even though the processor of the terminal cannot initiate an email message to such a communication identifier, this allows the user to see all of the extracted communication identifiers and understand how many will not be able to be contacted by email message.

After the list has been generated and displayed, the user would typically select one or more contacts and/or email addresses from the list. The user would select the contacts and/or email addresses of those people to whom the user wishes to send an email message. In block 150 it is determined if the user has selected any contacts and/or any email addresses. If the user has selected any contacts or email addresses, then the processor of the terminal would typically initiate an email message to that email address(es), as illustrated in block 152. As email generally supports multiple addressees in one email message, there would typically be no limit to the number of contacts and/or email addresses the user could select.

It should be appreciated that the process of replying by email message described in FIGS. 3 and 3D has advantages over the "reply-all" function in a typical email application. In a typical email application, selecting reply-all to a received message will typically copy email addresses from the main header of the received message into the header of the reply message. The reply-all function in a typical email application will not copy email addresses from the body of the received email message or from headers of other messages embedded within the received message (e.g., forwarded messages) into the header of the reply message. The process of replying by email message of the present invention advantageously enables a user to select any email address that was in any part of the received message to be copied into the header of the reply message. The process of the current invention also advantageously allows a user to reply by email to an email address that was not in the received email message, as long as a contact in the user's contact list contains a communication identifier that is in the received message and the contact also contains an email address.

If it is determined in block 120 of FIG. 3 that the user has selected the option to reply by sending a meeting request by email, the processor of the terminal will typically generate and display a list of contacts and/or email addresses, as illustrated in block 154 of FIG. 3E. As discussed above, requests for two types of meetings, physical and online, may generally be sent. As the method of replying to an email message by sending a meeting request is very similar regardless of whether it is a physical meeting or an online meeting, these two types of meeting requests will be discussed together. The list generated in block 154 will typically comprise any contacts that contain a communication identifier that matches one of the communication identifiers extracted from the received email message and that contains an email address for the contact. For example, the received email may have contained a telephone number for a particular person. If that particular person is in the user's contact list, and that person's telephone number and email address are in the contact, then the contact will be displayed in the generated list. If that particular person is in the user's contact list, and that person's telephone number is in the contact but that person's email address is not in the contact, then the contact will typically not be displayed in the generated list because the terminal will not be able to initiate a meeting request by email to that person. The generated list will typically also comprise any email address that were extracted from the received email message (either from a header or from the body of the message) but did not match any email addresses in any of the contacts. Even though such an email address does not match any of the contacts, the processor of the terminal can still initiate a meeting request by email to such an email address if selected by the user.

In an alternative embodiment of the present invention, the generated and displayed list may include communication identifiers that were extracted from the received email message but which did not match to a contact containing an email address. Even though the processor of the terminal cannot initiate an email message to such a communication identifier, this allows the user to see all of the extracted communication identifiers and understand how many will not be able to be sent a meeting request by email.

After the list has been generated and displayed, the user would typically select one or more contacts and/or email addresses from the list. The user would select the contacts and/or email addresses of those people to whom the user wishes to send a meeting request by email. In block 156 it is determined if the user has selected any contacts and/or any email addresses. If the user has selected any contacts or email addresses, then the processor of the terminal would typically initiate an email message comprising a meeting request to that email address(es), as illustrated in block 158. As email generally supports multiple addressees in one email message, there would typically be no limit to the number of contacts and/or email addresses the user could select.

If it is determined in block 122 of FIG. 3 that the user has selected the option to reply by sending a meeting request by instant message, the processor of the terminal will typically generate and display a list of contacts, as illustrated in block 160 of FIG. 3F. This list will typically comprise any contacts that contain a communication identifier that matches one of the communication identifiers extracted from the received email message and that contains an IM screen name for the contact. For example, the received email may have contained a telephone number for a particular person. If that particular person is in the user's contact list, and that person's telephone number and IM screen name are in the contact, then the contact will be displayed in the generated list. If that particular person is in the user's contact list, and that person's telephone number is in the contact but that person's IM screen name is not in the contact, then the contact will typically not be displayed in the generated list because the terminal will not be able to initiate a meeting request by instant message to that person.

In an alternative embodiment of the present invention, the generated and displayed list may include communication identifiers that were extracted from the received email message but which did not match to a contact containing an IM screen name. Even though the processor of the terminal cannot initiate an instant message to such a communication identifier, this allows the user to see all of the extracted communication identifiers and understand how many will not be able to be sent a meeting request by instant message.

After the list has been generated and displayed, the user would typically select one or more contacts from the list. The user would select the contacts of those people to whom the user wishes to send a meeting request by instant message. In block 162 it is determined if the user has selected any contacts. If the user has selected any contacts, then the processor of the terminal would typically initiate an instant message comprising a meeting request to that contact(s), as illustrated in block 164.

As discussed above, a contact in the user's contact list may contain more than one telephone number, more than one email address, and/or more than one IM screen name. When such a contact is included in the generated list of contacts from which to select, the processor of the terminal will need to determine which of the more than one telephone numbers, which of the more than one email addresses, or which of the more than one IM screen names to use when the user selects such a contact. For example, the user may have stored a work telephone number and a home telephone number for a particular contact. When the user chooses in block 112 to reply by phone and then selects such a contact from the list generated in block 124, the processor of the terminal will have two different telephone numbers to which the processor can place a telephone call. In one embodiment of the invention, the processor of the terminal may prompt the user in this example to select one of the two different telephone numbers. In an alternative embodiment, the list that is generated in block 124, in this example, may include two entries for such a contact, with an indication adjacent to each entry to indicate which telephone number will be used when each entry is selected. In this example, the list might display the following two entries: (1) John Smith (work); and (2) John Smith (home). In either of the two preceding embodiments the user is presented all possible options and allowed to select the appropriate option. In another alternative embodiment, the processor of the terminal may not present all possible options to the user if the processor is able to determine which option corresponds with the extracted communication identifier. For example, if the extracted communication identifier is an email address that matches an email address in the user's contact list having an indication that the email address is a business email address (as compared to a personal email address), and if the contact list also comprises two telephone numbers, one of which has an indication that the telephone number is a business telephone number, then the processor would only present the business telephone number to the user as the business telephone number would likely be the preferred telephone number to use in this example.

In the embodiment of the invention illustrated in FIGS. 3-3F, the processor of the terminal would typically display the options from which the user would typically select a reply method (as indicated in block 110 of FIG. 3) and then the processor, in response to a selection by the user of a reply method, would display the contacts and/or communication identifiers from which the user could then select to which to reply by the previously selected method (as indicated in, for example, block 124 of FIG. 3A). In an alternative embodiment not illustrated in FIGS. 3-3F, the processor of the terminal would typically display the contacts and/or communication identifiers extracted from the received email message and matched to the user's contact list and then, in response to a selection by the user of one or more contacts and/or communication identifiers, the processor would display the available reply methods for the selected contacts and/or communication identifiers.

The method of replying to a received email message using any one of several different communication methods may be embodied by a computer program product. The computer program product includes a computer-readable storage medium, such as the non-volatile storage medium, and computer-readable program code portions, such as a series of computer instructions, embodied in the computer-readable storage medium. Typically, the computer program is stored by a memory device and executed by an associated processing unit, such as the processing element of the server.

In this regard, FIGS. 3-3F is a flowchart of methods and program products according to the invention. It will be understood that each step of the flowchart, and combinations of steps in the flowchart, can be implemented by computer program instructions. These computer program instructions may be loaded onto one or more computers or other programmable apparatus to produce a machine, such that the instructions which execute on the computer or other programmable apparatus create means for implementing the functions specified in the flowchart step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart step(s).

Accordingly, steps of the flowchart support combinations of means for performing the specified functions, combinations of steps for performing the specified functions and program instruction means for performing the specified functions. It will also be understood that each step of the flowchart, and combinations of steps in the flowchart, can be implemented by special purpose hardware-based computer systems which perform the specified functions or steps, or combinations of special purpose hardware and computer instructions.

The terminal and computer program product of the present invention enable a user of a communication device to reply to a received email message using any one of several different communication methods by automatically retrieving email addresses, telephone numbers, proper names, and the like from anywhere in the received email message, matching the retrieved communication identifiers or proper names to the user's contact list, and selecting the desired reply method. As such, the user is able to quickly and easily choose the most effective method of replying, with a reduced number of keystrokes and reduced inefficiency.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising:
at least one processor; and
at least one memory including computer program code, the at least one memory and the computer program code configured to, with the at least one processor, cause the apparatus to at least perform the following:
parse a received email message to extract one or more communication identifiers and one or more proper names of at least one entity from the email message, the communication identifiers comprise one or more telephone numbers, email addresses or instant messaging (IM) screen names;
determine whether at least one of the extracted communication identifiers match a communication identifier from any contacts in a contact list stored in the memory, the contact list comprising at least one contact, the at least one contact comprising a proper name and at least one of the communication identifiers;
generate a list comprising one or more contacts for which the extracted communication identifier matches the communication identifier from the at least one contact,
wherein the at least one extracted communication identifier corresponds to a person or entity other than a sender of the email message; and
facilitate display of the generated list.

2. The apparatus of claim 1, wherein the computer program code further causes the apparatus to:
extract at least one proper name from the email message; and
determine whether the extracted proper name matches the proper name from any of the contacts in the contact list.

3. The apparatus of claim 1, wherein the computer program code further causes the apparatus to:
execute a telephony application;
generate a list comprising a contact for which the extracted communication identifier matches the communication identifier from the contact and for which the contact comprises a telephone number and the list further comprising the extracted communication identifier in an instance in which the extracted communication identifier does not match the communication identifier from a contact and in an instance in which the extracted communication identifier is a telephone number, in response to a selection by the user to reply to the email message by telephone;
facilitating display of the generated list; and
initiate a telephone call in response to a selection by the user of a contact in the generated list, or in response to a selection by the user of a communication identifier in the generated list.

4. The apparatus of claim 3, wherein the computer program code further causes the apparatus to:
initiate a telephone conference call in response to a selection by the user of at least two contacts in the generated list, or in response to a selection by the user of at least one contact in the generated list and at least one communication identifier in the generated list, or in response to a selection by the user of at least two communication identifiers in the generated list.

5. The apparatus of claim 3, wherein the computer program code further causes the apparatus to:
determine a time of day at a location where the initiated telephone call will be received; and
alert the user in an instance in which the time of day is within a predefined time range.

6. The apparatus of claim 1, wherein the computer program code further causes the apparatus to:
execute an IM application;
generate a list comprising a contact for which the extracted communication identifier matches the communication identifier from the contact and for which the contact comprises an IM screen name, in response to a selection by the user to reply to the email message by instant message; and
initiate an instant message in response to a selection by the user of a contact in the generated list.

7. The apparatus of claim 6, wherein the computer program code further causes the apparatus to:
determine a presence status of the contact in the generated list; and
facilitate provision of an indication to the user of the presence status of the contact in the generated list.

8. The apparatus of claim 1, wherein the computer program code further causes the apparatus to:
execute an IM application;
generate a list comprising a contact for which the extracted communication identifier matches the communication identifier from the contact and for which the contact comprises an IM screen name in response to a selection by the user to reply to the email message by chat request; and initiate at least one invitation to participate in an on-line chat in response to a selection by the user of at least one contact in the generated list, 9. The apparatus of claim 1, wherein the computer program code further causes the apparatus to:

execute a text messaging application;

generate a list comprising a contact for which the extracted communication identifier matches the communication identifier from the contact and for which the contact comprises a telephone number and the list further comprising the extracted communication identifier in an instance in which the extracted communication identifier does not match the communication identifier from a contact and in an instance in which the extracted communication identifier is a telephone number in response to a selection by the user to reply to the email message by text message; and initiate a text message in response to a selection by the user of a contact in the generated list, or in response to a selection by the user of a communication identifier in the generated list.

10. The apparatus of claim 1, wherein the computer program code further causes the apparatus to:

generate a list comprising a contact for which the extracted communication identifier matches the communication identifier from the contact and for which the contact comprises an email address and the list further comprising the extracted communication identifier in an instance in which the extracted communication identifier does not match the communication identifier from a contact and in an instance in which the extracted communication identifier is an email address in response to a selection by the user to reply to the email message by email message; and initiate an email message in response to a selection by the user of a contact in the generated list, or in response to a selection by the user of a communication identifier in the generated list.

11. The apparatus of claim 1, wherein the computer program code further causes the apparatus to:

generate a list comprising a contact for which the extracted communication identifier matches the communication identifier from the contact and for which the contact comprises an email address and the list further comprising the extracted communication identifier in an instance in which the extracted communication identifier does not match the communication identifier from a contact and in an instance in which the extracted communication identifier is an email address in response to a selection by the user to reply to the email message with a meeting request;

initiate at least one meeting request in response to a selection by the user of at least one contact in the generated list or at least one communication identifier in the generated list; and initiate at least two meeting requests in response to a selection by the user of at least one contact in the generated list and at least one communication identifier in the generated list.

12. The apparatus of claim 1, wherein the computer program code further causes the apparatus to:

generate a list comprising a contact for which the extracted communication identifier matches the communication identifier from the contact and for which the contact comprises an email address and the list further comprising the extracted communication identifier in an instance in which the extracted communication identifier does not match the communication identifier from a contact and in an instance in which the extracted communication identifier is an email address in response to a selection by the user to reply to the email message with an online meeting request;

initiate at least one online meeting request in response to a selection by the user of at least one contact in the generated list or at least one communication identifier in the generated list; and initiate at least two online meeting requests in response to a selection by the user of at least one contact in the generated list and at least one communication identifier in the generated list.

13. The apparatus of claim 1, wherein the computer program code further causes the apparatus to:

execute an IM application;

generate a list comprising a contact for which the extracted communication identifier matches the communication identifier from the contact and for which the contact comprises an IM screen name in response to a selection by the user to reply to the email message with a meeting request; and initiate at least one meeting request in response to a selection by the user of at least one contact in the generated list.

14. The apparatus of claim 1, wherein the computer program code further causes the apparatus to compare each of the extracted communication identifiers to the contact list stored in the memory of the apparatus or a remote memory of a server accessible by the apparatus.

15. A computer program product comprising at least one computer-readable storage medium having computer-readable program code portions stored therein, the computer-readable program code portions comprising:

a first executable portion configured to parse a received email message to extract one or more communication identifiers and one or more proper names of at least one entity from the email message, the communication identifiers comprise one or more telephone numbers, email addresses or instant messaging (IM) screen names;

a second executable portion configured to determine whether at least one of the extracted communication identifiers match a communication identifier from any contacts in a contact list, the contact list comprising a proper name and at least one contact, the at least one contact comprising at least one of the communication identifiers;

a third executable portion configured to generate a list comprising one or more contacts for which the extracted communication identifier matches the communication identifier from the at least one contact, wherein the at least one extracted communication identifier corresponds to a person or entity other than a sender of the email message; and a fourth executable portion configured to facilitate display of the generated list.

16. The computer program product of claim 15, further comprising:

a fifth executable portion configured to extract at least one proper name from the email message; and a sixth executable portion configured to determine whether the extracted proper name matches the proper name from any of the contacts in the contact list.

17. The computer program product of claim 15, further comprising:

a fifth executable portion configured to generate a list comprising a contact for which the extracted communication identifier matches the communication identifier from the contact and for which the contact comprises a telephone number and the list further comprising the extracted communication identifier in an instance in which the extracted communication identifier does not match the communication identifier from a contact and in an instance in which the extracted communication identifier is a telephone number, in response to a selection by the user to reply to the email message by telephone;

a sixth executable portion configured to facilitate display the generated list; and a seventh executable portion configured to initiate a telephone call in response to a selection by the user of a contact in the generated list or in response to a selection by the user of a communication identifier in the generated list.

18. The computer program product of claim 17, further comprising:
an eighth executable portion configured to initiate a telephone conference call in response to a selection by the user of at least two contacts in the generated list, or in response to a selection by the user of at least one contact in the generated list and at least one communication identifier in the generated list, or in response to a selection by the user of at least two communication identifiers in the generated list.

19. The computer program product of claim 17, further comprising:
an eighth executable portion configured to determine a time of day at a location where the initiated telephone call will be received and alerting the user in an instance in which the time of day is within a predefined time range.

20. The computer program product of claim 15, further comprising:
a fifth executable portion configured to generate a list comprising a contact for which the extracted communication identifier matches the communication identifier from the contact and for which the contact comprises an IM screen name in response to a selection by the user to reply to the email message by instant message; and a sixth executable portion configured to initiate an instant message in response to a selection by the user of a contact in the generated list.

21. The computer program product of claim 20, further comprising:
a seventh executable portion configured to determine a presence status of the contact in the generated list and providing an indication to the user of the presence status of the contact in the generated list.

22. The computer program product of claim 15, further comprising:
a fifth executable portion configured to generate a list comprising a contact for which the extracted communication identifier matches the communication identifier from the contact and for which the contact comprises an IM screen name in response to a selection by the user to reply to the email message by chat request; and a sixth executable portion configured to initiate at least one invitation to participate in an on-line chat in response to a selection by the user of at least one contact in the generated list.

23. The computer program product of claim 15, further comprising:
a fifth executable portion configured to generate a list comprising a contact for which the extracted communication identifier matches the communication identifier from the contact and for which the contact comprises a telephone number and the list further comprising the extracted communication identifier in an instance in which the extracted communication identifier does not match the communication identifier from a contact and in an instance in which the extracted communication identifier is a telephone number, in response to a selection by the user to reply to the email message by text message; and a sixth executable portion configured to initiate a text message in response to a selection by the user of a contact in the generated list, or in response to a selection by the user of a communication identifier in the generated list.

24. The computer program product of claim 15, further comprising:
a fifth executable portion configured to generate a list comprising a contact for which the extracted communication identifier matches the communication identifier from the contact and for which the contact comprises an email address and the list further comprising the extracted communication identifier in an instance in which the extracted communication identifier does not match the communication identifier from a contact and in an instance in which the extracted communication identifier is an email address, in response to a selection by the user to reply to the email message by email message; and a sixth executable portion configured to initiate an email message in response to a selection by the user of a contact in the generated list, or in response to a selection by the user of a communication identifier in the generated list.

25. The computer program product of claim 15, further comprising:
a fifth executable portion configured to generate a list comprising a contact for which the extracted communication identifier matches the communication identifier from the contact and for which the contact comprises an email address and the list further comprising the extracted communication identifier in an instance in which the extracted communication identifier does not match the communication identifier from a contact and in an instance in which the extracted communication identifier is an email address, in response to a selection by the user to reply to the email message with a meeting request; and a sixth executable portion configured to initiate at least one meeting request in response to a selection by the user of at least one contact in the generated list or at least one communication identifier in the generated list; and a seventh executable portion configured to initiate at least two meeting requests in response to a selection by the user of at least one contact in the generated list and at least one communication identifier in the generated list.

26. The computer program product of claim 15, further comprising:
a fifth executable portion configured to generate a list comprising a contact for which the extracted communication identifier matches the communication identifier from the contact and for which the contact comprises an email address and the list further comprising the extracted communication identifier in an instance in which the extracted communication identifier does not match the communication identifier from a contact and in an instance in which the extracted communication identifier is an email address, in response to a selection by the user to reply to the email message with an online meeting request; and a sixth executable portion configured to initiate at least one online meeting request in response to a selection by the user of at least one contact in the generated list or at least one communication identifier in the generated list; and a seventh executable portion configured to initiate at least two online meeting requests in response to a selection by the user of at least one contact in the generated list and at least one communication identifier in the generated list.

27. The computer program product of claim 15, further comprising:

a fifth executable portion configured to generate a list comprising a contact for which the extracted communication identifier matches the communication identifier from the contact and for which the contact comprises an IM screen name in response to a selection by the user to reply to the email message with a meeting request; and a sixth executable portion configured to initiate at least one meeting request in response to a selection by the user of at least one contact in the generated list.

28. The computer program product of claim 15, further comprising:

a fifth executable portion configured to compare each of the extracted communication identifiers to the contact list, the contact list is stored in a memory of an apparatus or a remote memory of a server that is accessible by the apparatus.

29. A method comprising:

parsing a received email message to extract one or more communication identifiers and one or more proper names of at least one entity from the email message, the communication identifiers comprise one or more telephone numbers, email addresses or instant messaging (IM) screen names;

determining, via a processor, whether at least one of the extracted communication identifiers match a communication identifier from any contacts in a contact list, the contact list comprising a proper name and at least one contact, the at least one contact comprising at least one of the communication identifiers;

generating a list comprising one or more contacts for which the extracted communication identifier matches the communication identifier from the at least one contact, wherein the at least one extracted communication identifier corresponds to a person or entity other than a sender of the email message; and facilitating display of the generated list.

30. The method of claim 29, further comprising:

extracting at least one proper name from the email message; and determining whether the extracted proper name matches the proper name from any of the contacts in the contact list.

31. The method of claim 29, further comprising:

comparing each of the extracted communication identifiers to the contact list, the contact list is stored in a memory of an apparatus or a remote memory of a server that is accessible by the apparatus.

32. The method of claim 29, further comprising:

generating a list comprising a contact for which the extracted communication identifier matches the communication identifier from the contact and for which the contact comprises a telephone number and the list further comprising the extracted communication identifier in an instance in which the extracted communication identifier does not match the communication identifier from a contact and in an instance in which the extracted communication identifier is a telephone number, in response to a selection by the user to reply to the email message by telephone;

facilitating display of the generated list; and initiating a telephone call in response to a selection by the user of a contact in the generated list or in response to a selection by the user of a communication identifier in the generated list.

33. The method of claim 32, further comprising:

initiating a telephone conference call in response to a selection by the user of at least two contacts in the generated list, or in response to a selection by the user of at least one contact in the generated list and at least one communication identifier in the generated list, or in response to a selection by the user of at least two communication identifiers in the generated list.

34. The method of claim 32, further comprising:

determining a time of day at a location where the initiated telephone call will be received; and alerting the user in an instance in which the time of day is within a predefined time range.

35. The method of claim 29, further comprising:

generating a list comprising a contact for which the extracted communication identifier matches the communication identifier from the contact and for which the contact comprises an IM screen name in response to a selection by the user to reply to the email message by instant message; and initiating an instant message in response to a selection by the user of a contact in the generated list.

36. The method of claim 35, further comprising:

determining a presence status of the contact in the generated list; and facilitating provision of an indication to the user of the presence status of the contact in the generated list.

37. The method of claim 29, further comprising:

generating a list comprising a contact for which the extracted communication identifier matches the communication identifier from the contact and for which the contact comprises an IM screen name in response to a selection by the user to reply to the email message by chat request; and initiating at least one invitation to participate in an on-line chat in response to a selection by the user of at least one contact in the generated list.

38. The method of claim 29, further comprising:

generating a list comprising a contact for which the extracted communication identifier matches the communication identifier from the contact and for which the contact comprises a telephone number and the list further comprising the extracted communication identifier in an instance in which the extracted communication identifier does not match the communication identifier from a contact and in an instance in which the extracted communication identifier is a telephone number, in response to a selection by the user to reply to the email message by text message; and initiating a text message in response to a selection by the user of a contact in the generated list, or in response to a selection by the user of a communication identifier in the generated list.

39. The method of claim 29, further comprising:

generating a list comprising a contact for which the extracted communication identifier matches the communication identifier from the contact and for which the contact comprises an email address and the list further comprising the extracted communication identifier in an instance in which the extracted communication identifier does not match the communication identifier from a contact and in an instance in which the extracted communication identifier is an email address, in response to a selection by the user to reply to the email message by email message; and initiating an email message in response to a selection by the user of a contact in the generated list, or in response to a selection by the user of a communication identifier in the generated list.

40. The method of claim 29, further comprising:

generating a list comprising a contact for which the extracted communication identifier matches the communication identifier from the contact and for which the contact comprises an email address and the list further comprising the extracted communication identifier in an instance in which the extracted communication identifier does not match the communication identifier from a contact and in an instance in which the extracted communication identifier is an email address, in response to a selection by the user to reply to the email message with a meeting request;

initiating at least one meeting request in response to a selection by the user of at least one contact in the generated list or at least one communication identifier in the generated list; and initiating at least two meeting requests in response to a selection by the user of at least one contact in the generated list and at least one communication identifier in the generated list.

41. The method of claim 29, further comprising:

generating a list comprising a contact for which the extracted communication identifier matches the communication identifier from the contact and for which the contact comprises an email address and the list further comprising the extracted communication identifier in an instance in which the extracted communication identifier does not match the communication identifier from a contact and in an instance in which the extracted communication identifier is an email address, in response to a selection by the user to reply to the email message with an online meeting request;

initiating at least one online meeting request in response to a selection by the user of at least one contact in the generated list or at least one communication identifier in the generated list; and initiating at least two online meeting requests in response to a selection by the user of at least one contact in the generated list and at least one communication identifier in the generated list.

42. The method of claim 29, further comprising:

generating a list comprising a contact for which the extracted communication identifier matches the communication identifier from the contact and for which the contact comprises an IM screen name, in response to a selection by the user to reply to the email message with a meeting request; and initiating at least one meeting request in response to a selection by the user of at least one contact in the generated list.

* * * * *